United States Patent Office 3,761,463
Patented Sept. 25, 1973

3,761,463
METHOD OF EXTRACTING PECTIN
Joseph M. G. Haung, East Windsor, N.J., assignor to NL Industries, Inc., New York, N.Y.
No Drawing. Filed July 21, 1972, Ser. No. 273,861
Int. Cl. C08b 19/12
U.S. Cl. 260—209.5                                16 Claims

ABSTRACT OF THE DISCLOSURE

An improved method of extracting pectin from citrus peel is described which includes the steps of forming a heated aqueous slurry of citrus peel and an ion exchange agent at a pH of between 1.3 and 1.6, separating the peel and ion exchange agent from the slurry and recovering an aqueous pectin extract. Improved yields and quality factors of pectin are obtained by this process with gel grades maintained at high levels. The pectin obtained is useful in aiding the viscosity and gel strength of processed foods.

BACKGROUND OF THE INVENTION

(1) Field of the invention

Pectic substances are almost universally distributed in plant tissue, where they act as cementing materials between cells, particuarly in the maintenance of texture in fresh fruits and vegetables and also in the viscosity or gel strength of processed foods such as catsup, jelly, preserves, and low solid gels. Pectin, the jelly making substance in fruits, is one of the only pectic substances so far commercialized.

The instant invention provides for a novel process for the extraction and isolation of pectin from citrus peels such that the pectin product thus obtained has improved yield and quality factors together with the maintenance of high gel grades.

(2) Description of the prior art

In the past, various methods have been employed for the removal of pectin from plant tissues of raw material such as citrus peels, apple pomace and sugar beet slices. In the commercial manufacturing of pectin, the citrus peel is solubilized and extracted simultaneously with an aqueous mineral acid such as sulfuric acid or hydrochloric acid.

A major disadvantage of this process is that partial hydrolysis of the pectin molecule occurs during the processing. The degradation and hydrolysis has the effect of lowering the yield and quality of the pectin material thus obtained. The conditions of temperature, time, type of acid, ratio of water to peel and pH also vary considerably from process to process. The variations in these processes make the pectin thus produced a compromise between maximum yield and the minimum of degradation and hydrolysis of the pectin.

In addition to mineral acid extractions, various organic acids and their salts, inorganic salts, and inorganic bases have been reported in the prior art as extractants for pectin from citrus peels. These methods show no advantage over mineral acid extraction in improving the yield of pectin. Another difficulty involved in the use of these methods is that the extracted peels are difficult to filter through common filtering materials such as paper, muslin cloth, glass wool, or combinations thereof. Pectin in the form of an insoluble metallic pectinate has also been extracted by the reaction with ion exchange materials such as zeolites.

According to the process of the instant invention, 10–35% improved yields of pectin are obtained over the prevailing mineral acid extractions with quality maintained at the highest level.

SUMMARY OF THE INVENTION

It is an object of this invention to provide a new process for the manufacture of pectin which will result in increased yields and quality of pectin.

Another object of this invention is to provide a rapid and reproducible method for the extraction of pectin from citrus peels.

A still further objective of this invention is to provide a process for the extraction of pectin which results in minimal hydrolysis and degradation of the pectin molecule.

An even further object of this invention is to provide a process for the manufacture of pectin which will be simple, inexpensive and economically feasible.

The objects of the instant invention are accomplished by:

(a) Forming a heated aqueous slurry having a pH of between 1.3 to 1.6 of a pectin containing substance and an ion-exchange agent;

(b) Recovering an aqueous solution having dissolved therein said pectin; and (c) Recovering pectin from said aqueous solution.

Prior to the utilization of citrus peel for the extraction of pectin, as well known in the art, the raw peel is first smashed and then chopped to provide a pulpy mass. This mass is then washed several times with water to remove sugar and other water soluble impurities and then squeezed to remove the bulk of the water. The peel is then dried to remove about 50 to 90% of the water contained therein and is ground to form dried chips.

After forming the dried peel chips, the process of this invention is applied by forming a heated aqueous slurry of the peel chips and ion exchange agent as a pH of between 1.3 and 1.6. The method of forming the slurry may be carried out in a number of ways. For example, the citrus peel and ion exchange agent may first be combined with water. The pH is next adjusted and the slurry heated. Alternately, the citrus peel may be combined with water and the pH is adjusted after which the ion exchange agent is added and the slurry heated. With respect to the pH, it may also be adjusted just prior to the separation of citrus peel and ion exchange agent from the pectin containing aqueous medium after heating is completed.

In a typical procedure, the citrus peel is first combined with 30 to 60 times its weight of water and the ion exchange agent is added. The pH of the slurry is adjusted to between 1.3 and 1.6 and the slurry is heated under agitation for two hours. The slurry is filtered to separate the insoluble ion exchange and the citrus peel from the aqueous medium containing the dissolved pectin. The dissolved pectin is then precipitated in the form of a pectin gel using a precipitating agent such as isopropyl alcohol.

The pectin gel is filtered and then washed with isopropyl alcohol. The gel is then dried above room temperature under reduced pressure to yield pectin in the form of a powder.

It has been found by the process of this invention that yields as high as from 22 to 30% of pectin and gel grades of between 135 and 200 have been achieved with numerous varieties of pectic substances.

In the practice of this invention, any natural pectin containing substances may be employed. Citrus peels, particularly those derived from lemon, grapefruit, orange and lime are deemed most suitable and are preferred as they are readily available, inexpensive, and contain substantial amounts of pectin. Other sources of pectin, such as apple pomace and sugar beet slices are also amenable in the practice of this invention.

DESCRIPTION OF THE PREFERRED EMBODIMENTS

The ion exchange agents which may be employed in this invention may be represented by the formula R—X; wherein R, the base material, may be an aliphatic, aromatic, polymeric vinyl aromatic or crosslinked polymeric vinyl aromatic base material such as polystyrene, polystyrene crosslinked with vinyl benzene or divinyl benzene, benzene or naphthalene; X may be represented by such groups as $-SO_3H$, $-CO_2H$, $-PO_4H$, $-CH_2NH_3^+$, $-SO_3^-$, $-CO_2^-$, $-PO_4^{\equiv}$ or any other radical capable of forming ions in water. The function of the base material is to act as a hydrophobic inert substrate for the ionic group X which can exchange ions in solutions. Among the materials most suitably employed for the process are cation and anion exchange resins such as sulfonated polystyrene resins, e.g., Amberlite IR-120 Plus; total exchange capacity 4.20 m.e./g. (molar equivalents per gram), sulfonated styrene-divinyl benzene resins, carboxylic ion exchange resins of crosslinked acrylic polymers, e.g., Amberlite IRC-84; total exchange capacity 10.5 m.e./g., carboxylic ion exchange resins of methacrylic acid-divinyl benzene copolymers e.g., Amberlite IRC-50; total exchange capacity 10.0 m.e./g., basic anion exchange resins of aminated chloromethylated styrene-divinyl benzene resins e.g., Amberlite IRA-400; total exchange capacity 3.3 m.e./g. and mixtures thereof; all the above specifically named commercial ion exchange resins being available from the Rohn & Haas Co.

The invention is not limited to the above mentioned resins and any commercial resin well known in the art having similar chemical properties may be used. It has also been found that organic aromatic acids such as p-toluene sulfonic acid and naphthalene sulfonic acids may also be used as the ion exchange agent. All the resins employed should be stable to degradation at temperatures up to 100° C. and resistant to mild acid hydrolysis.

The use of ion exchange agents containing a $-SO_3H$ exchange group are preferable in the practice of the invention. Resins other than the $-SO_3H$ type give comparable yields but gel grades are lower.

When forming the aqueous slurry of citrus peel and ion exchange agent, the amount of water used is preferably from 30 to 60 times the amount of citrus peel. If less than these amounts are used, solubilization of the pectin may be retarded and the separation step becomes more difficult. When greater amounts of water are added, it is difficult to precipitate the pectin using efficient amounts of alcohol. The slurry may be conveniently heated for about 2–3 hours at between 65° and 95° C. If heating is prolonged substantially more than three hours, the yield and grade of pectin is decreased. At temperatures below 65° C. extraction efficient is reduced and at heating temperatures above 95°, degradation of the pectin molecule takes place and such temperatures are to be avoided.

The weight of ion exchange resin which may be used with the citrus peel is between 0.1 and 0.5 part of resin for each part of peel and preferably between 0.3 and 0.4 part of resin for each part of peel. At levels of resin less than 0.1 part for each part of citrus peel the final yield of pectin is diminished. At levels greater than 0.5 the yield is substantially the same and therefore any increase in the resin serves no useful purpose.

The pH of the slurry must be adjusted to between 1.3 and 1.6 prior to separation of the pectin. At acid concentrations above pH 1.6 the yield of pectin is significantly diminished. At acid concentrations below pH 1.3 the pectin molecule undergoes degradation resulting in decreased yields and gel strengths. The pH may be adjusted using the inorganic or organic acids known in the art. Hydrochloric acid is preferably employed for the process since it is inexpensive, easy to handle and undergoes no adverse reactions with the pectin in the peel using relatively small amounts of acid required for the adjustment of the pH.

The solid citrus peel and ion exchange agent may be separated from the aqueous slurry by filtering with the aid of diatomaceous earth (e.g., Celite–545, Johns Manville & Co.). The ion exchange agent may then be separated from the extracted peel using conventional techniques and recycled for subsequent use.

The aqueous medium containing the dissolved pectin after filtering is treated with a water soluble precipitating agent to take the pectin out of solution, usually in the form of a pectin gel. Among the precipitating agents which may be used are the water soluble alcohols such as methanol, ethanol, propanol and isopropanol and water soluble ketones such as acetone and methyl ethyl ketone. The pectin gel is squeezed through muslin cloth and the recovered pectin is washed with an aqueous alcohol solution. Other methods are also suitable for recovering the pectin from the aqueous solution. For example, the water can be removed by evaporation under reduced pressure to yield a pectin solid. The pectin may also be removed by addition of aluminum, magnesium, or copper salts which precipitate the pectin in the form of a metal pectate. After filtering the metal pectate from the water and dissolved impurities, it is redistributed in water and acidified to precipitate only the metal salts which are removed by filtration. The pectin in the filtrate is then precipitated with alcohol as described above. It was found that precipitation with alcohol alone was the most preferable method for the recovery of the pectin.

The gel grade of pectin is a measure of the quality of a pectin sample as a gellant when applied in making an aqueus gel with sugar. It is defined as the number of grams of sucrose with which one gram of pectin will form a 65% soluble solid aqueous gel of specified strength at a pH between 2.2 and 2.5. The term specified strength is related to the ability of the gel thus obtained to remain stable to separation and break-down over a two minute period. The strength is measured by the difference in height of the gel's measurement in centimeters compared with a standard gel firmness. The standard procedure applied to determine the gel grade of pectin was accomplished for the pectin products noted in the examples below as set forth in "Pectin Standardization, Final Report of the Institute of Food Technology," vol. 13, pp. 496–500 (1959).

The isolated pectin may be evaluated for ash content, equivalent weight, methoxyl content, viscosity, and molecular weight. Tests have indicated that no appreciable degradation or hydrolysis of the recovered pectin occurs. The quality factor of pectin is defined as the product of the pectin yield and the gel grade. It was found that values of between 3100 and 5700 for the quality factor were obtained for the pectin isolated using the instant process.

In order to more fully describe the instant invention, the following examples are given:

EXAMPLE 1

This example illustrates the use of a sulfonated polystyrene resin (Amberlite IR–120 Plus, Rohm & Haas Co.) as the ion exchange agent for the extraction of pectin from orange peel.

A quantity of dried orange peel was first ground until the dried orange peel was in the form of chips. Sixty grams of ground dried peel was added to 1800 grams of water to yield a peel to water ratio of 1:30. Eighteen grams of the sulfonated polystyrene resin was added to give a ratio of 0.3 g. of resin to 1 g. of peel. The pH of the aqueous medium was 5.0. Dilute hydrochloric acid was added to adjust the pH to 1.6. The mixture was heated to 85° C. for two hours with constant stirring. Water was added occasionally to maintain constant volume and the heating and stirring was maintained at this temperature for three hours. The solid materials were filtered with the aid of diatomaceous earth and the clear thick filtrate was precipitated with 1800 g. of isopropyl alcohol to form a pectin gel. The gel was next filtered and squeezed through muslin cloth. The pectin was then washed with 50% aqueous isopropanol and dried at 40° C. under reduced pressure. The yield of the recovered pectin was 24.15% based on the weight of dried peel. The gel grade was 159 and the quality factor was 3840. Methoxyl content, equivalent, and ash content determination indicated that the pectin had not undergone any substantial degradation or hydrolysis.

A comparison was made applying the procedure of Example 1 using the sulfonated polystyrene resin alone with no pH adjustment. The yield was 18.65%; gel grade was 168 and quality factor was 3.133. When the process was carried out without an ion exchange agent but with a pH adjustment of 1.6 the yield was 19.20%; gel grade was 160; quality factor was 3,072.

EXAMPLE 2

The procedure of Example 1 was repeated except that lemon peel was substituted for orange peel. The ratio of resin to peel was 0.4. The yield of pectin was 29.5; gel grade was 192; quality factor was 5,664. Employing orange peel, comparisons were made using the process of Example 1 except that in one case the ion exchange agent was added without a pH adjustment and in the second case a pH adjustment was made without the presence of any ion exchange agent. When the ion exchange agent was used without a pH adjustment the yield of pectin was 23.17%; gel grade was 107; quality factor was 2,479. When the pH adjustment was made without the presence of the ion exchange agent the yield of pectin was 26.67%; gel grade 176; quality factor 4,694.

EXAMPLE 3

The procedure of Example 1 was repeated except that grapefruit peel was substituted for orange peel. Yield of pectin was 29.60; gel grade 172; quality factor 5,091.

When the above procedure was repeated using the ion exchange agent with no pH adjustment, the yield of pectin was 19.10%; gel grade 168, quality factor 3,209. When the pH was adjusted with HCl without the use of ion exchange agent the yield was 23.35%; gel grade was 173; quality factor was 4,039.

EXAMPLE 4

In this example, a carboxylic cation exchange resin of methacrylic acid-divinyl benzene in its acid form (Amberlite IRC-50 Rohm & Haas) was substituted for the sulfonated polystyrene resin used in Example 1.

The procedure of Example 1 was followed using 18 g. of resin to 60 g. of orange peel. The pH was adjusted to 1.6.

The yield of pectin thus obtained was 22.3%. The gel grade was 142 and the quality factor was 2,167. When the process was carried out using the ion exchange agent with no adjustment in pH, the yield of pectin was 11.5%.

EXAMPLE 5

The procedure of Example 1 was followed using a mixture of an anion exchange resin of an aminated chloromethylated styrene-divinyl benzene copolymer (IRA-400, Rohm & Haas) and a sulfonated polystyrene cation exchange resin (Amberlite IR-120, Rohm & Haas) instead of the sulfonated polystyrene resin.

The amount of resin added was 0.3 g. for each gram of peel. The pH was adjusted to 1.6.

The yield of pectin was 24.5%. The gel grade was 135 and the quality factor was 3,307. When this example was repeated using the ion exchange resin with no pH adjustment the yield of pectin was 16.5%.

EXAMPLE 6

This example illustrated the use of p-toluene sulfonic acid as the ion exchange agent.

Sixty grams of dried orange peel chips were added to 1800 g. of water. Six grams of p-toluene sulfonic acid was added to give a ratio of 0.1 g. of sulfonic acid to 1 g. of peel. Dilute hydrochloric acid was added to adjust the pH of 1.6 and the mixture was heated to 85° C. with constant stirring for two hours. The solid materials were filtered with the aid of diatomaceous earth and the filtrate was treated with 1800 g. of isopropyl alcohol to form a pectin gel. The filtrate also contained the p-toluene sulfonic acid which remained soluble in the alcohol-water mixture. The gel was next filtered and squeezed through muslin cloth. The pectin was then washed with 50% aqueous isopropanol and dried at 40° C. under reduced pressure. The yield of pectin was 21.5%; gel grade was 161 and the quality factor was 3,462.

EXAMPLE 7

This example illustrates the use of a different pH adjustment after heating the citrus peel with the ion exchange agent.

The procedure of Example 1 was followed except the pH was adjusted to 1.3 instead of 1.6.

The yield of pectin thus obtained was 24.8%. The gel grade was 132 and the quality factor was 3,323.

EXAMPLE 8

This example describes the results of pectin yield, quality factor and gel grade when the pH is adjusted before addition of the ion exchange agent.

Sixty grams of ground dried orange peel was added to 1800 grams of water to yield a peel to water ratio of 1:30. Dilute hydrochloric acid was added to adjust the pH to 1.6. The mixture was heated to 85° C. with constant stirring. Water was added occasionally to maintain constant volume and the heating and stirring was maintained at this temperature for two and one half hours. Eighteen grams of sulfonated polystyrene resin was added and the stirring was continued at 85° C. for an additional half hour. The solid materials were filtered with the aid of diatomaceous earth and the clear filtrate was precipitated with 1800 grams of isopropanol to form a pectin gel. The gel was filtered and squeezed through muslin cloth. The pectin was then washed with 50% aqueous isopropanol and dried at 40° C. in a vacuum oven. The yield of pectin thus obtained was 23.7% based on the weight of dried peel. The gel grade was 146 and the quality factor was 3,460.

What is claimed is:

1. A method for the extraction of pectin from pectin containing substances which comprises the steps of:
    (a) forming an aqueous slurry having a pH of between 1.3 to 1.6 of a pectin containing substance and an ion exchange agent, said ion exchange agent represented by the formula R—X, wherein R is a hydrophobic base material selected from the group consisting of aliphatic, aromatic, polyvinyl aromatic and crosslinked polyvinyl aromatic compounds and X is a radical selected from the group consisting of sulfonate, carboxylate, phosphate, ammonium and amino methylene;
    (b) recovering an aqueous solution having pectin dissolved therein; and
    (c) recovering said pectin from said aqueous solution.
2. The method of claim 1 wherein the slurry is heated at temperatures from 65° C. to 95° C. before recovering said aqueous solution to facilitate the solubilization of pectin into said aqueous solution.
3. The method of claim 1 wherein the ion exchange agent is selected from the group consisting of sulfonated polystyrene ion exchange resins, sulfonated styrene-divinyl benzene ion exchange resins, carboxylic ion exchange resins of crosslinked acrylic polymers, carboxylic ion exchange resins of methacrylic acid-divinyl benzene copolymers, aminated chloro-methylated styrene-divinyl benzene ion exchange resins, p-toluene sulfonic acid, naphthalene sulfonic acids, and mixtures thereof.

4. The method of claim 1 wherein the weight of water in the aqueous slurry is from 30 to 60 times the weight of the pectin containing substance.

5. The method of claim 1 wherein the ratio of pectin containing substance to ion exchange agent in the aqueous slurry is from 10:1 to 10:5.

6. The method of claim 1 wherein the ratio is pectin containing substance to ion exchange agent in the aqueous slurry is from 10:3 to 10:4.

7. The method of claim 1 wherein the recovery of said pectin from said aqueous solution comprises treating said aqueous solution with a precipitating agent to form an aqueous pectin gel and removing water from said gel removing water from said gel to provide pectin powder.

8. A method for extracting pectin from substantially anhydrous dried citrus peel which comprises;
    (a) forming a water slurry of the citrus peel and an ion exchange agent wherein said water is at least 30 times the weight of said peel and the ratio of peel to ion exchange agent is from 10:1 to 10:5, wherein said ion exchange agent is represented by the formula R—X, wherein R is a hydrophobic base material selected from the group consisting of aliphatic, aromatic, polyvinyl aromatic and crosslinked polyvinyl aromatic and X is a radical selected from the group consisting of sulfonate, carboxylate, phosphate, ammonium and amino methylene;
    (b) adjusting the pH of said slurry to between 1.3 and 1.6;
    (c) heating siad slurry;
    (d) recovering a water solution from the slurry containing dissolved pectin; and
    (e) recovering pectin from said water solution.

9. The method of claim 8 wherein the ion exchange agent is selected from the group consisting of sulfonated polystyrene ion exchange resins, sulfonated styrene-divinyl benzene ion exchange resins, carboxylic ion exchange resins of crosslinked acrylic polymers, carboxylic ion exchange resins of methacrylic acid-divinyl benzene copolymers, aminated chloromethylated styrene-divinyl benzene ion exchange resins, p-toluene sulfonic acid, naphthalene sufonic acids and mixtures thereof.

10. The method of claim 8 wherein the water slurry is heated to between 65 and 95° C.

11. The method of claim 8 wherein the recovery of pectin from said water solution consists of treating said water solution with a precipitating agent to form an aqueous pectin gel and removing water from said gel to provide pectin powder.

12. The method of claim 11 wherein the precipitating agent is selected from the group consisting of methanol, ethanol, propanol, iso-propanol, acetone and methyl ethyl ketone.

13. A method for the recovery of pectin from dried citrus peel which comprises the steps of;
    (a) adding said citrus peel to water to form a slurry wherein the weight of water is from 30 to 60 times the weight of citrus peel;
    (b) adding an ion exchange agent to said slurry wherein the ratio of citrus peel to ion exchange agent is from 10:3 to 10:4, said ion exchange agent represented by the formula R—X, wherein R is a hydrophobic base material selected from the group consisting of aliphatic, aromatic, polyvinyl aromatic and crosslinked polyvinyl aromatic compounds and X is a radical selected from the group consisting of sulfonate, carboxylate, phosphate ammonium and amino methylene;
    (c) adjusting the pH of said slurry to between 1.3 and 1.6;
    (d) heating said slurry to between 65° and 95° C.;
    (e) separating said ion exchange agent and citrus peel from said slurry to obtain an aqueous solution containing said pectin;
    (f) adding a precipitating agent to said aqueous solution and form an aqueous pectin gel; and
    (g) recovering said pectin from said pectin gel.

14. The method of claim 13 wherein the ion exchange agent is selected from the group consisting of sulfonated polystyrene ion exchange resins, sulfonated styrene-divinyl benzene ion exchange resins, carboxylic ion exchange resins of crosslinked acrylic polymers, carboxylic ion exchange resins of methacrylic acid-divinyl benzene copolymers, aminated chloromethylated styrene-divinyl benzene ion exchange resins, p-toluene sulfonic acid, naphthalene sulfonic acids and mixtures thereof.

15. The method of claim 13 wherein the precipitating agent is selected from the group consisting methanol, ethanol, propanol, iso-propanol, acetone and methyl ethyl ketone.

16. The method of claim 13 wherein said citrus peel is selected from the group consisting of orange, lemon, grapefruit and lime.

References Cited
UNITED STATES PATENTS

| | | | |
|---|---|---|---|
| 2,020,572 | 11/1935 | Platt | 260—209.5 |
| 2,323,483 | 7/1943 | Myers et al. | 260—209.5 |
| 2,173,260 | 9/1939 | Leo et al. | 260—209.5 |
| 2,375,376 | 5/1945 | MacLay et al. | 260—209.5 |
| 2,469,684 | 5/1949 | Dudley | 260—209.5 |
| 2,577,232 | 12/1951 | Cole | 260—209.5 |

MAURICE J. WELSH, Primary Examiner

R. W. GRIFFIN, Assistant Examiner